July 16, 1968 J. N. PEARSE 3,393,351

RELAY FLIP-FLOP UTILIZING TWO RELAYS

Filed July 14, 1965

INVENTOR
JAMES N. PEARSE

BY Thomas E. Kloehn

ATTORNEY

United States Patent Office 3,393,351

Patented July 16, 1968

3,393,351

RELAY FLIP-FLOP UTILIZING TWO RELAYS

James N. Pearse, Menomonee Falls, Wis., assignor to Allen-Bradley Company, Milwaukee, Wis., a corporation of Wisconsin Filed July 14, 1965, Ser. No. 472,000
6 Claims. (Cl. 317—137)

ABSTRACT OF THE DISCLOSURE

Three flip-flops are shown, each made up of two reeu relays, an input signal source, and an input switch. Each of the relays has two, oppositely polarized windings to actuate its reed contacts. The leading edge relay has single contacts and the trailing edge relay has single pole, double throw contacts. The first embodiment employs electrical latching. The second and third embodiments have permanent latching magnets on the leading edge contacts. Two embodiments employ diodes. The third embodiment substitutes resistors in series with each of the energizing coils of the relays for the diodes.

Figure 1:
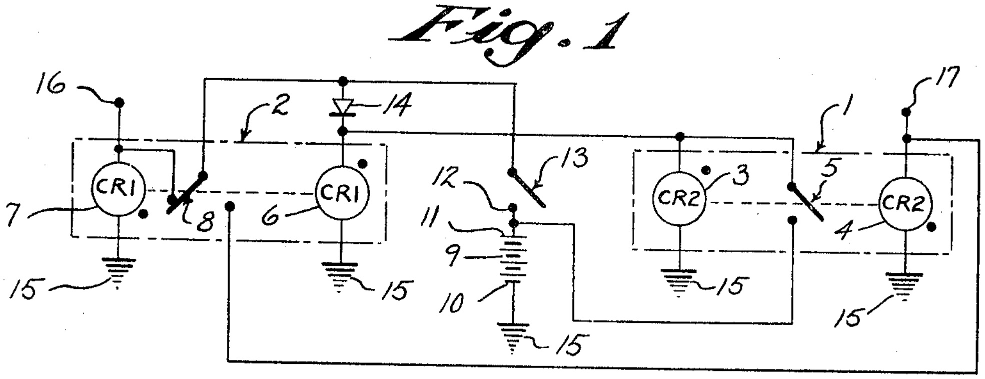

The present invention relates to a relay flip-flop utilizing two relays, each of which has an energizing coil, a deenergizing coil and a contact means actuated by said coils, and which are connected so that the energizing coil of the first relay may be energized through an input switch or the contact means of a second relay, and so that the deenergizing coils of the two relays may be alternately energized through the contact means of said first relay.

There is a need, particularly in industrial applications, for flip-flops that can operate from multiple input signals and provide multiple output signals, and in which the input signals and output signals are completely isolated. In applications where the extreme high speed of electronic flip-flops is not required, the present invention fills those needs with a relay flip-flop which provides the desired operating characteristics along with several other advantages.

The relay flip-flop of the present invention is particularly characterized by the extraordinary austerity and economy of its circuitry in its ability to function with a minimum number of components. Moreover, the few components that are required are components of proven reliability and stability. The present invention requires only two relays, and those having but a bare minimum number of relay contacts. In addition to the relays, two embodiments require only one blocking diode, and another embodiment eliminates that diode in favor of an even more stable, reliable and better known component: the resistor. Where speed of operation is desired, electrical latching or memory may be employed, but where permanent memory and minimization of power requirements are more important considerations, the present invention may also employ permanent magnet latching or memory. With permanent magnet latching, the flip-flop has a memory capable of surviving power failures, and the power requirements of the flip-flop may be reduced anywhere from a fourth to a ninth of that of the electrically latched embodiment. Finally, the flip-flop of the present invention is capable of providing either trailing edge or leading edge logic, and this characteristic alone vastly enhances the versatility and applicability of the flip-flop.

Accordingly, it is an object of the present invention to provide a flip-flop in which the input signals and output signals are completely isolated.

It is another object of the present invention to provide a flip-flop with a capacity for multiple input.

It is another object of the present invention to provide a flip-flop capable of producing multiple output signals.

It is another object of the present invention to provide a flip-flop characterized by maximum austerity of circuit components.

It is another object of the present invention to provide a relay flip-flop utilizing only the most reliable and stable of electrical components.

It is another object of the present invention to provide a relay flip-flop that may be either electrically or magnetically latched.

It is another object of the present invention to provide a relay flip-flop capable of providing either leading edge or trailing edge logic.

Three embodiments of the present invention will be described herein, and in the course of that description reference will be made to the accompanying drawings, which form a part of this disclosure. However, the description of these embodiments is not intended to define the scope of the subject matter of the present invention. Instead, the written description and the drawings serve only to set forth the best modes contemplated of carrying out the invention, and to clearly describe the manner and process of making and using the invention in such full, clear and concise and exact terms as to enable any person skilled in the art to make and use the invention. By contrast, the scope of the invention is defined by the claims appearing at the conclusion of the specification, wherein that which is regarded as the invention is particularly pointed out and distinctly claimed.

Figure 2:
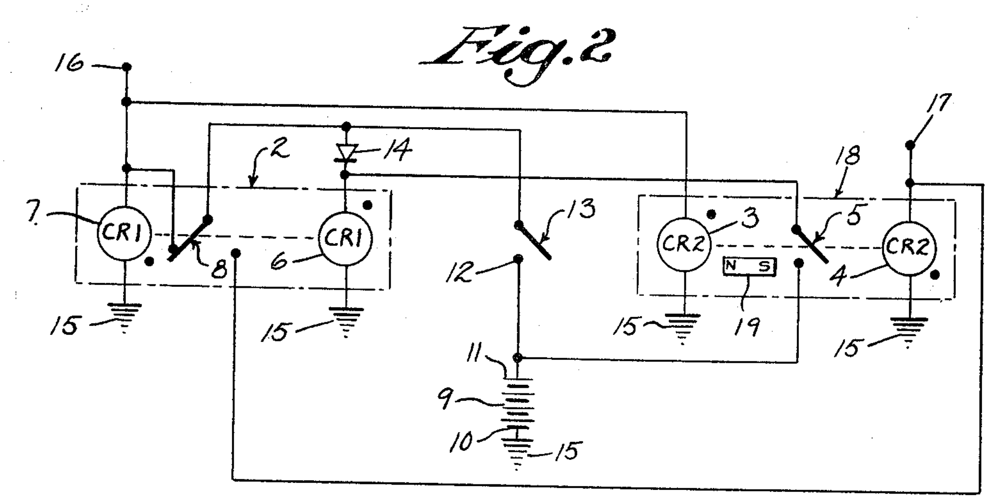
Figure 3:
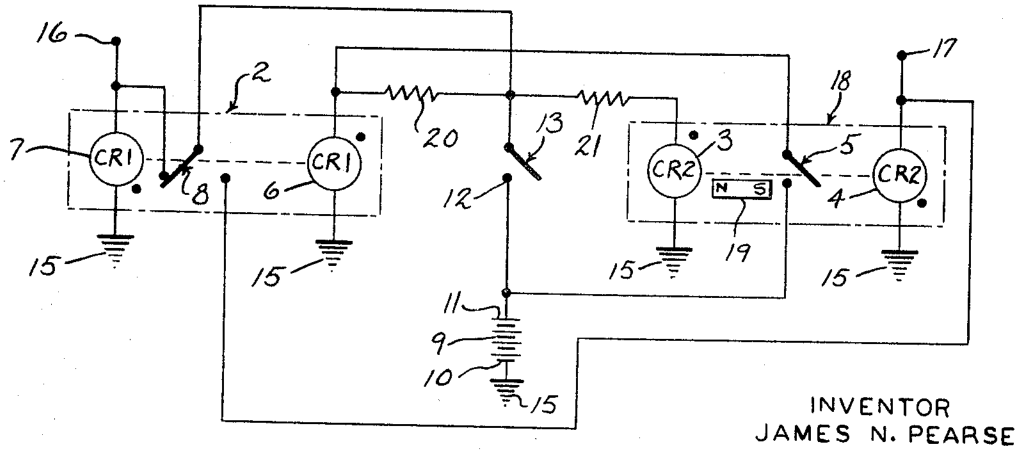

In the drawings:

FIG. 1 is a schematic diagram of a preferred embodiment of the invention utilizing electrical latching, FIG. 2 is a schematic diagram of a second embodiment of the invention utilizing permanent magnet latching or memory, and FIG. 3 is a schematic diagram of a third preferred embodiment of the invention wherein no diodes are required and the circuitry employs only relays and resistors.

*FIG. 1 embodiment*

Referring now specifically to the drawings, in FIG. 1 a schematic diagram of an embodiment of the present invention is shown employing electrical memory and utilizing only a single diode in conjunction with the relays. Two relays are employed, a leading edge relay 1 and a trailing edge relay 2, which are so denominated here to designate the portion of the input signal upon which they operate. The leading edge relay 1 has an energizing coil 3, a deenergizing coil 4 and a normally open single-pole-single-throw contact means 5. The trailing edge relay 2 is quite similar in that it also has an energizing coil 6, a deenergizing coil 7, but its contact means are of the single-pole-double-throw type. A unidirectional input signal source 9 is designated by the symbol for a battery, which has its negative pole 10 grounded and its positive pole 11 connected to one terminal 12 of an input signal switch 13.

Those major components of the embodiment shown in FIG. 1 require only the addition of a blocking diode 14 and proper circuit arrangement to constitute a flip-flop embodying the present invention. The energizing coil 3 of the leading edge relay 1 is connected to be energized by the input source 9, either through the contact means 5 of the leading edge relay, or through the input signal switch 13 and the blocking diode 14. The energizing coil 6 of the trailing edge relay is likewise connected to be energized by the input signal source 9, either through the contact means 5 of the leading edge relay 1, or through the input signal switch 13 and the blocking diode 14. The deenergizing coils 4 and 7 respectively of the leading edge relay 1 and the trailing edge relay 2 are connected to receive input signals at their deenergizing ends either through the input signal switch 13, or through the contact means 8 of the trailing edge relay 2. Signal return is provided through a common ground 15, to which the negative pole 10 of the input source 9 is connected, along with each of the relay operating coils 3, 4, 6 and 7. The flip-flop is also provided with a set signal input terminal 16 connected to the deenergizing coil 7 of the trailing edge relay 2 to receive a set input signal and energize the deenergizing coil 7. A reset signal input terminal 17 is connected to the deenergizing end of the deenergizing coil 4 of the leading edge relay 1 to receive a reset input signal. The reset signal input terminal 17 could also be connected to the energizing end of the energizing coil 6 of the leading edge relay 1 to produce a set on the leading edge of an input pulse and to avoid danger of transient malfunction resulting from a set signal input while the flip-flop is in the set condition.

The leading edge relay 1 and the trailing edge relay 2, in actual practice, are made up of dry reed contact modules with double wound coils. The contact means 8 of the trailing edge relay 2 is normally closed to connect the deenergizing coil 7 of the trailing edge relay 2 to the input signal switch 13. The contact means 5 of the leading edge relay 1 is a simple normally open reed contact. The terms "single-pole," "double-throw" and "normally open" contacts as used in this description and the claims to follow are intended to include all of the various contact arrangements which in their operation can function similarly enough to the structure shown as to provide the same flip-flop operation.

To operate the first embodiment of this invention, the first input pulse may be introduced by closing the input signal switch 13 to impose an input signal on the energizing coil 3 of the leading edge relay 1, on the energizing coil 6 of the trailing edge relay 2 and on the deenergizing coil 7 of the trailing edge relay 2, as the input signal passes through the input signal switch 13 and the contact means 8 of the trailing edge relay 2 and the blocking diode 14. Since the input signal to the trailing edge relay 2 is applied equally to the energizing and deenergizing coils 6 and 7, it has no effect on the condition of the trailing edge relay 2 and its contact means 8 remain in the same position as shown in the drawing. However, the input signal through the energizing coil 3 of the leading edge relay 1 will close the normally-open contact means 5 of that relay 1 so that the energizing coils 3 and 6 of the leading edge relay 1 and the trailing edge relay 2 respectively are connected directly to the positive pole 11 of the unidirectional input signal source 9.

Now when the input signal switch 13 is opened, the input signal is removed from the deenergizing coil 7 of the trailing edge relay 2 by the operation of the input signal switch 13 and the blocking diode 14, and now the contact means 8 of the trailing edge relay 2 may be actuated by the input signal through the contact means 5 of the leading edge relay 1 to the energizing coil 6 of the trailing edge relay 2. Since the input signal switch 13 is open, the contact means 8 of the trailing edge relay 2 are closed to complete a circuit to the deenergizing coil 4 of the leading edge relay.

Hence, upon closing the input switch 13 to produce the next input signal, the input signal will energize the deenergizing coil 4 of the leading edge relay 1, cancelling the effect of the energizing coil 3 of the leading edge relay 1 and permitting the contact means 5 of the leading edge relay 1 to return to its normally open condition. At the trailing edge of the input signal when the input signal switch 13 is opened, the energizing coils 3 and 6 of both relays 1 and 2 will be simultaneously deenergized as will be the deenergizing coil of the leading edge relay 1, and the contact means 8 of the trailing edge relay 2 will then return to its normal position as shown in the drawings.

If the flip-flop is in its reset condition and it is desired to set it, the positive pole 11 of the unidirectional input signal source 9 can be connected to the set signal input terminal 16, thus imposing equal input signals on the energizing and deenergizing coils of the trailing edge relay 2 as well as on the energizing coil 3 of the leading edge relay 1, actuating the contacts of the leading edge relay 1. On the trailing edge of the set signal, the energizing coil 6 of the trailing edge relay 2, being energized through the contact means 5 of the leading edge relay 1, will actuate the contact means 8 of the trailing edge relay 2, since it is no longer opposed by an input signal to the deenergizing coil 7 of the trailing edge relay 2, completing the set action of the flip-flop. To reset the flip-flop, when it is in set condition, the positive pole of the unidirectional input signal source 9 can be connected by appropriate means (not shown) to the reset signal input terminal 17 on the deenergizing coil 4 of the leading edge relay 1. This will cancel the effect of the energizing coil 3 of the leading edge relay 1, permitting the contact means 5 of the leading edge relay 1 to return to the normally open condition. Thereafter, at the trailing edge of the reset signal, the energizing coil 6 of the trailing edge relay 2 will be deenergized, permitting the contact means 8 of the trailing edge relay 2 to return to the normal position, and the flip-flop is thus reset.

*FIG. 2 embodiment*

Turning now to the second embodiment of the present invention, where a permanent magnet latching is utilized instead of an electrical latching, it will be seen that the circuitry and components are in large part, the same as those of the first embodiment. A different leading edge relay 18 is used, though it has the same energizing coil 3, deenergizing coil 4 and normally open contact means 5, but it differs in also having a latching magnet 19 which was not present in the previous embodiment. The trailing edge relay 2 is in all respects similar to the trailing edge relay 2 in the previous embodiment, and hence the same reference numerals are utilized to designate its energizing coil 6, its deenergizing coil 7, and its contact means 8. Also, the unidirectional input signal source 9 has its negative pole 10 connected to the common ground 15 as are the relay coils 3, 4, 6 and 7.

Just as in the first embodiment, the energizing coil 6 of the trailing edge relay 2 is connected to be energized either through the input signal switch 13 and the locking diode 14, or through the contact means 5 of the leading edge relay 18. Also, as in the first embodiment, the deenergizing coils 4 and 7 respectively of the leading edge relay 18 and trailing edge relay 2 are connected to be energized alternately through the input signal switch 13 or through the single-pole-double-throw contact means 8 of the trailing edge relay 2. However, the second embodiment is distinguished from the first in that the energizing coil 3 of the leading edge relay 18 is connected to be energized in common with the deenergizing coil 7 of the trailing edge relay 2 through the contact means 8 of the trailing edge relay 2. Hence, the energizing coil 3 of the leading edge relay 18 is normally energized whenever the input signal switch 13 is closed and the flip-flop is in its normal or reset condition.

In operation, the second embodiment produces the same sequence of events as did the first embodiment. When the flip-flop is in the normal condition shown in FIG. 2, and the input switch 13 is closed, the leading edge of the initial input signal will simultaneously energize the energizing coil 6 and the deenergizing coil 7 of the trailing edge relay 2, and the energizing coil 3 of the leading edge relay 18. The input signal through the energizing and deenergizing coils 6 and 7 of the trailing edge relay will cancel one another, and the contact means 8 of the trailing edge relay 2 will remain in the condition shown in the drawings. However, the input signal through the contact means 8 of the trailing edge relay 2 and the energizing coil 3 of the leading edge relay 18 will close the normally open contact means 5 of the leading edge relay 18, and the contact means 5 will be latched in the closed position by the latching magnet 19. At the trailing edge of the initial input pulse when the input signal switch 13 is closed, the deenergizing coil 7 of the trailing edge relay 2 and the energizing coil 3 of the leading edge relay 18 will no longer receive input signals, but the energizing coil 6 of the trailing edge relay will continue to receive an input signal, since it is connected to the input signal source 9 through the latched contact means 5 of the leading edge relay 18. On the trailing edge of the first input signal, the contact means 8 of the trailing edge relay 2 will be actuated to complete a circuit to the deenergizing coil 4 of the leading edge relay 18. Hence, upon the leading edge of the second input pole when the input switch 13 is closed for a second time, the input signal will pass through the input switch 13 and the contact means 8 of the trailing edge relay 2 to energize the deenergizing coil 4 of the leading edge relay 18, with the result that the contact means 5 of the leading edge relay 18 will open. With the contact means 5 of the leading edge relay 18 open, the opening of the input switch 13 to terminate the second input signal pulse will leave the energizing coil 6 of the trailing edge relay 2 deenergized, permitting the single-pole-double-throw contact means 8 of the trailing edge relay 2 to return to its normal condition and the flip-flop is now restored to the condition shown in FIG. 2. The introduction of an input signal on the set signal terminal 16 will have the same effect as did the first pulse through the input signal switch 13, and when the flip-flop is in a set condition, the introduction of an input signal through the reset signal terminal 17 will have the same effect as the second input pole through the input switch which has been described above.

*FIG. 3 embodiment*

The third embodiment of the present invention eliminates the diode from the circuit and inserts two current limiting resistors 20 and 21 in series between the input signal switch 13 and the energizing coil 3 of the leading edge relay 18 and the energizing coil 6 of the trailing edge relay 2, respectively. The leading edge relay 18 shown in FIG. 3 is the same as the leading edge relay 18 shown in FIG. 2 in that both utilize a permanent latching magnet 19, as distinguished from the leading edge relay 1 shown in FIG. 1 which utilizes an electrical latching. As in FIGS. 1 and 2, the deenergizing coils 4 and 7 respectively of the leading edge relay 18 and the trailing edge relay 2 are connected to be alternatively energized through the contact means 8 of the trailing edge relay 2 or through the input signal switch 13. Also, as in the previous two embodiments, the energizing coil 6 of the trailing edge relay 2 is connected to be energized through tthe contact means 5 of the leading edge relay 18. However, as distinguished from either of the two preceding embodiments, the energizing coil 6 of the trailing edge relay 2 is also connected to be energized through the input signal switch 13 and the current limiting resistor 20, and the energizing coil 3 of the leading edge relay 18 is connected to be energized through the input signal switch 13 and the current limiting resistor 21.

Once again, the sequential operation of the two relays is the same as in the preceding two embodiments. On the leading edge of the first input signal when the input signal switch 13 is closed with the flip-flop in the condition illustrated in the drawing, the energizing coils 3 and 6 of the leading edge relay 18 and the trailing edge relay 2 each received a weak input signal due to the effect of the current limiting resistors 20 and 21, and the deenergizing coil 7 of the trailing edge relay 2 receives a full strength input signal through the contact means 8 of the trailing edge relay 2. As a result, the trailing edge relay 2 remains in the condition shown in FIG. 3, but the weak electromagnetic field generated through the energizing coil 3 of the leading edge relay 18 acting in conjunction with the field from the latching magnet 19 will activate the normally open contact means 5 of the leading edge relay 18 into a closed position, thus imparting a full input signal on the energizing coil 6 of the trailing edge relay 2. Hence, at the trailing edge of the first input pulse when the input switch 13 is opened, the deenergizing coil 7 of the trailing edge relay 2 will be deenergized, but the energizing coil 6 of the trailing edge relay 2 will continue to be energized through the contact means 5 of the leading edge relay 18, which are latched in closed position by the permanent magnet 19. The trailing edge relay contact means 8, being actuated on the trailing edge of the first input pulse, closes a circuit between the input signal switch 13 and the deenergizing coil 4 of the leading edge relay 18. Now when the input signal switch 13 is closed creating the leading edge of the second input pulse, the deenergizing coil 4 of the leading edge relay 18 will receive a full input signal, cancelling the combined effects of a latching magnet 19 and the weak signals through the energizing coils 3 to permit the contact means 5 of the leading edge relay 18 to return to its normally open condition. Under these circumstances, at the trailing edge of the second input signal pulse, the energizing coil 6 of the trailing edge relay 2 will be deenergized permitting the contact means 8 of the trailing edge relay 2 to return to the normal position. At the same time all of the other operating coils 3, 4 and 7 will also be deenergized, and the flip-flop will return to the condition shown in the drawing. As in the previous embodiment, an input signal imposed upon a set signal input terminal, when the flip-flop is in its normal or reset condition, will have the same effect as the first input pulse through the input signal switch, and a signal imposed upon the reset signal terminal 17, when the flip-flop is in the set condition, will have the same effect as the second input signal through the input signal switch 13 as was described above.

Any number of output signals can be produced by simply adding output contacts to be actuated by the coils of the relays as described above. If leading edge logic is desired, the output contacts may be added to the leading edge relays 1 and 18, so that an output signal will be obtained on the leading edge of the input signal. On the other hand, if trailing edge logic is preferred, as is commonly the case, the output contacts should be added to the trailing edge relay 2 so that an output signal will be obtained on the trailing edge of the input signal. It is evident, after reading the foregoing disclosure, that the output signal will be entirely isolated from the input signal so that any form of output signal can be achieved regardless of the type of input signal used. The magnitude of the output signal will be limited only by the capability of the components utilized, and the output signal may be direct current, alternating current, pulsating current or any form of output signal that may be desired. In fact, if appropriate relays were used a direct mechanical output signal could be obtained instead of electrical signals. Each embodiment of the present invention requires no more than two relays, each of which has two coils connected at opposite polarity as indicated by the polarity dots in the drawings and is arranged to actuate two different contact means, a simple single-pole-single-throw type normally open contact and a single-pole-double-throw type contact means. In addition to those components the various embodiments may require a blocking diode, or current limiting resistors, or a permanent latching magnet. Other components of course may be added and variations in the embodiments described here may be made without departing from the invention. However, it is by participating in the subject matter of the present invention that an apparatus will achieve the objects and manifest the advantages of the present invention, and accordingly that subject matter of the invention is set forth in the following claims.

I claim:

1. A relay flip-flop comprising the combination of
a terminal adapted to receive an electrical input signal;
an input signal switch connected to said terminal;

a trailing edge relay module having an energizing coil, a deenergizing coil and trailing edge contact means magnetically actuated by said coils, said contact means and said energizing coil being connected in series with said input signal switch and said input signal terminal, and said deenergizing coil being connected to normally receive an input signal through said trailing edge contact means;

and a leading edge relay module having an energizing coil, a deenergizing coil and leading edge contact means magnetically actuated by said coils, said energizing coil being connected to said input terminal in series with said input switch and in series with said leading edge contact means, and said deenergizing coil being connected in series with said trailing edge contact means to receive an input signal through said trailing edge contact means.

2. A relay flip-flop comprising the combination of a trailing edge relay having an energizing coil, a deenergizing coil and trailing edge contact means magnetically actuated by said energizing coil and said deenergizing coil;

a leading edge relay having an energizing coil, a deenergizing coil and lead edge contact means magnetically actuated by said energizing coil and said deenergizing coil;

an input terminal and an input switch connected in series;

said trailing edge contact means and energizing coil being connected to said input switch, and said trailing edge contact means being adapted to alternatively connect said trailing edge relay deenergizing coil and said leading edge relay deenergizing coil to said input switch;

and said leading edge relay energizing coil being connected to said input terminal in series with both said input switch and with said leading edge contact means.

3. A relay flip-flop according to claim 2 wherein said trailing edge relay contact means normally connects said trailing edge relay deenergizing coil to said input switch; and said leading edge relay contact means is normally open.

4. A relay flip-flop comprising the combination of an input terminal and an input switch connected in series, said input terminal being adapted to receive a unidirectional input signal;

a first relay having an energizing coil, a deenedgizing coil and contact means actuated by said coils, said contact means and said energizing coil being connnected to said input terminal, and said deenergizing coil normally being connected through said contact means to said input switch;

a blocking diode connected in series between said input switch and said first relay energizing coil;

a second relay having an energizing coil, a deenergizing coil and normally open contact means actuated by said coils, said second relay energizing coil being connected through said blocking diode to said input switch and being connected through said normally open second relay contact means to said input terminal, and said second relay deenergizing coil being connected to said input switch through said first relay contact means alternatively with said first relay deenergizing coil.

5. A relay flip-flop comprising the combination of an input terminal adapted to receive an unidirectional input signal and an input switch means connected in series with said terminal;

a first relay having an energizing coil, a deenergizing coil and contact means;

a second relay having an energizing coil, a deenergizing coil, normally open contact means, and a latching magnet;

said first relay energizing coil being connected to said input terminal through said input switch and through said second relay contact means;

a blocking resistor connected in series between said input switch and said first relay energizing coil to conduct an input signal to said first relay energizing coil;

and said first relay contact means being connected to said input switch and being adapted to connect said first relay deenergizing coil and said second relay energizing coil to said input switch and alternately to connect said second relay deenergizing coil to said input switch.

6. A relay flip-flop comprising the combination of an input terminal to receive a unidirectional input signal;

an input switch means connected to said input terminal;

a first relay having an energizing coil connected through a current limiting resistor to said input switch, a deenergizing coil, and contact means actuated by said coils and connected to said input switch;

a second relay having an energizing coil connected through a current limiting resistor to said input switch, a deenergizing coil, and normally open magnetically latched contact means connected in series between said input terminal and said first relay energizing coil;

and said first relay contact means being adapted to alternately connect said first relay deenergizing coil and said second relay deenergizing coil to said input switch.

References Cited

UNITED STATES PATENTS

| | | | |
|---|---|---|---|
| 1,732,711 | 10/1929 | Boddie | 317—137 X |
| 2,817,806 | 12/1957 | Borell | 307—132 X |
| 2,939,020 | 5/1960 | Hodson et al. | 307—132 |
| 3,172,425 | 3/1965 | Cox | 317—137 X |

ROBERT K. SCHAEFER, *Primary Examiner.*

T. B. JOIKE, *Assistant Examiner.*